Aug. 9, 1927.

J. F. PANYARD

PISTON PACKING

Filed Oct. 19, 1925

INVENTOR.
JOHN F. PANYARD

BY Parker & Burton
ATTORNEY.

Aug. 9, 1927.    J. F. PANYARD    1,638,453
PISTON PACKING
Filed Oct. 19, 1925    2 Sheets-Sheet 2
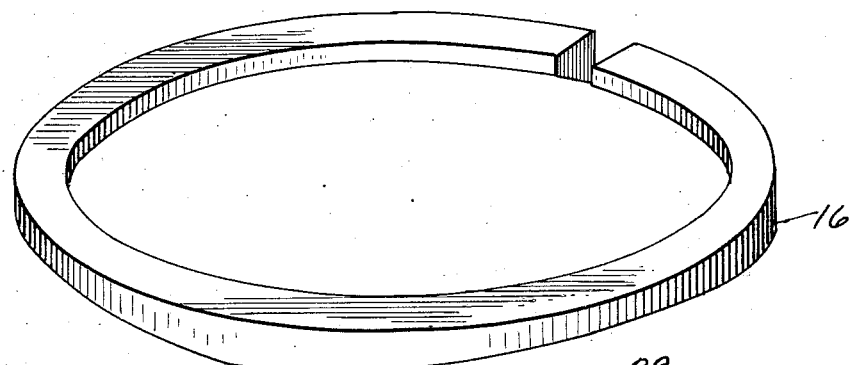
Fig. 6
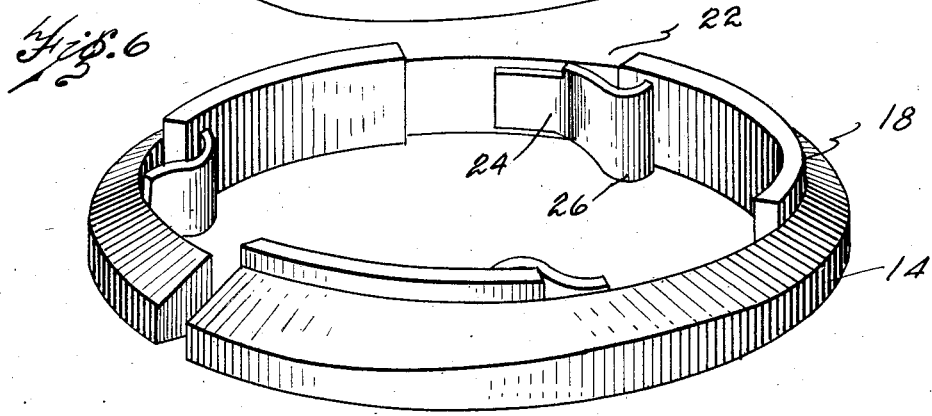
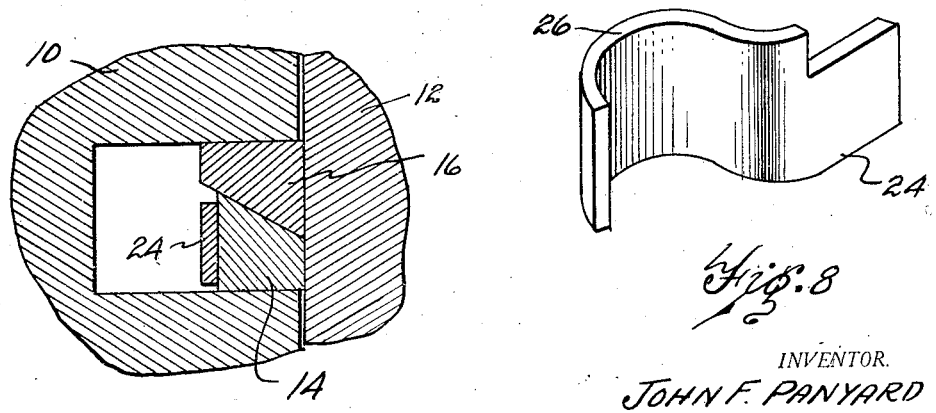
Fig. 7
Fig. 8
INVENTOR.
JOHN F. PANYARD
BY Parker & Burton
ATTORNEY.

Patented Aug. 9, 1927.

1,638,453

UNITED STATES PATENT OFFICE.

JOHN F. PANYARD, OF DETROIT, MICHIGAN.

PISTON PACKING.

Application filed October 19, 1925. Serial No. 63,330.

My invention relates to improvements in piston packing and particularly to that type of packing in which a packing ring having a helical axial face is urged rotatably within the groove counter an opposite helical meeting face to wedge the packing axially against the side walls of the groove, and to improve means for accomplishing the above result, and an improved ring structure adapted to quickly seat itself within the groove and within the cylinder in which the piston is working.

An object is to provide packing of the character above set forth with spring means carried by one of the ring sections adapted to constantly urge the section rotatably to hold the packing wedged against the side walls of the groove, and a meritorious feature resides in the employment of a packing ring having a quick seating face adapted to initially engage the cylinder wall to wear within a limited period of use to permit full engagement by the packing.

Other important advantages and useful features will more fully appear from the following description, appended claims and accompanying drawings, in which:

Fig. 6 is a perspective of a packing ring embodying my invention.

Fig. 7 is a cross-sectional view taken on line 7—7, Fig. 1.

Fig. 8 is a perspective of one of the spring members employed with my packing.

Figure 3:
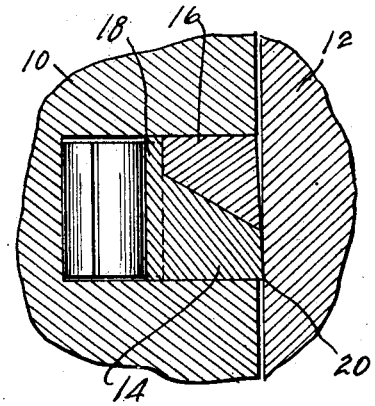
Fig. 3 is a cross-sectional view taken on line 3—3, Fig. 1.
Figure 4:
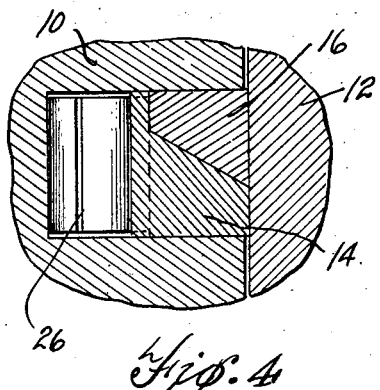
Fig. 4 is a cross-sectional view taken on line 3—3, Fig. 1, after wear of the rings.

In the drawings, let 10 indicate a piston having a packing groove to receive suitable packing rings, and in Figs. 3 and 7 a broken away portion of the cylinder wall is indicated as 12.

My improvement relates to packing of the class wherein the co-operating ring sections have helical meeting faces whereby upon rotation of one ring section counter the tapered face of the other ring section the packing is expanded axially against the side walls of the groove.

In the drawing, one ring section is indicated as 14 and the other ring section as 16. Ring section 14 might be termed the inner or base ring section as it is preferably provided with a base flange 18 which extends underneath the ring section 16.

The ring section 14 has a normal diameter greater than that of ring section 16 and a quick seating face 20 which initially exclusively engages the cylinder wall to wear within a limited period of use to permit the packing to completely engage the cylinder wall. This quick seating face is caused by relieving the outer periphery of the ring section, which may be accomplished by beveling the same or otherwise cutting it away so as to leave an edge at its maximum diameter.

Figure 1:
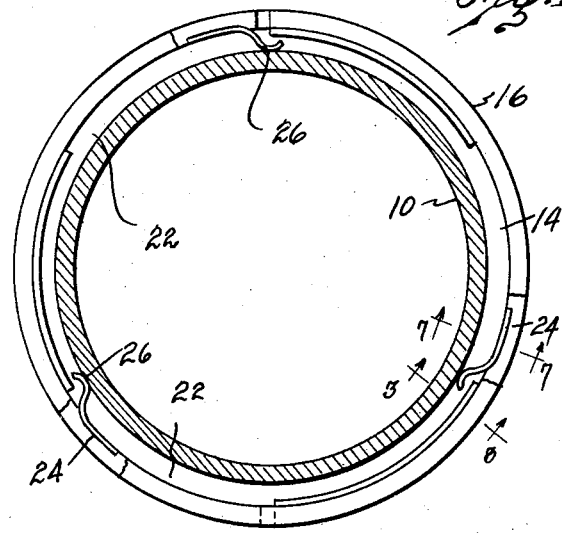
Figure 1 is a cross-sectional view through a piston showing my improved packing in elevation in place in the groove.
Figure 5:
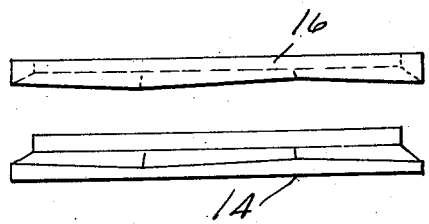
Fig. 5 is a side elevation of packing rings embodying my invention.

The base flange 18 of ring section 14 is cut away at intervals as at 22 underneath the ring section 16 and secured to the inner periphery of ring section 16 are spring members 24 which extend through cut-outs 22 of the flange 18 to engage the bottom of the groove in the piston. These spring members are bent as at 26 to provide convex portions engaging the bottom of the groove in the piston so that they are held under tension when the packing is seated in the groove to urge the ring 16 rotatably within the groove counter the tapered face of its co-operating ring section. The ring sections may have helical faces formed of a succession of helical planes as shown in Fig. 5 or a continuous helical plane as shown in Fig. 1. Each ring section is split and formed of suitable material for the purpose.

When first installed the quick seating edge 20 of ring section 14 initially exclusively engages the cylinder wall but wears within a limited period to permit engagement thereof by ring section 16, after which ring section 16 presents a more slowly wearing face to the cylinder than does ring section 14 and the packing is urged rotatably within the groove by the springs 24 being held under tension and having a tendency to impel the ring section 16 counter the helical meeting faces.

Figure 2:
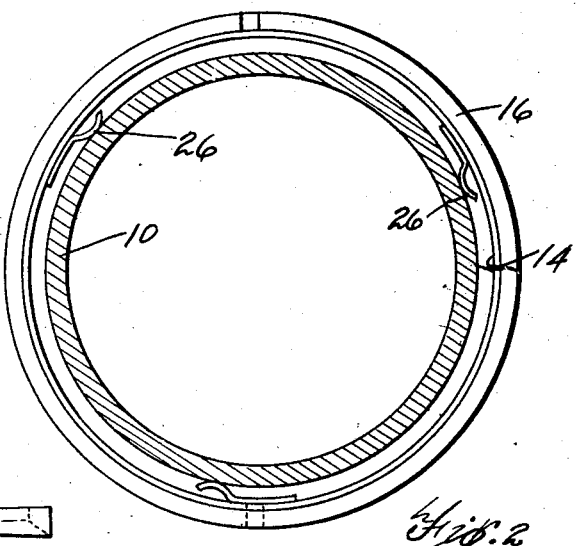
Fig. 2 shows a modified form of construction of my packing.

Fig. 2 shows a modified form of construction in which the spring members 26 are secured to ring section 14 instead of ring section 16.

What I claim is:

1. In piston packing, a piston having a groove for packing, packing in said groove comprising a pair of ring sections having helical meeting faces, one of said sections having a base flange extending underneath the second ring section, said base flange cut away at intervals, and spring members secured to the second ring section extending through the intervals in the base flange of the first ring section to engage the bottom of the groove in the piston.

2. In piston packing, a piston having a groove for packing, packing in said groove comprising an inner ring section having a helical side wall, a co-operating outer ring section seated thereagainst and having a helical meeting face, and spring members secured to the outer ring section and engaged against the bottom of the groove in the piston to urge the packing rotatably therein.

3. In piston packing, a piston having a groove for packing, packing in said groove comprising a pair of ring sections having helical meeting faces, one of said sections having a plurality of spring members secured to its inner circumference extending through the other ring section and having curved portions engaging the bottom of the groove in the piston.

In testimony whereof, I sign this specification.

JOHN F. PANYARD.